June 16, 1964  D. DOW ETAL  3,137,774
PLUNGER SWITCH
Filed Jan. 11, 1961

INVENTORS
DOUGLAS DOW
HOWARD A BOLTZ
BY
Burton & Parker
ATTORNEYS

United States Patent Office 3,137,774
Patented June 16, 1964

3,137,774
PLUNGER SWITCH
Douglas Dow, 1052 Seminole, Detroit 14, Mich., and Howard A. Boltz, Dearborn, Mich., assignors, by mesne assignments, to Douglas Dow, Detroit, Mich.
Filed Jan. 11, 1961, Ser. No. 82,114
3 Claims. (Cl. 200—16)

This invention relates to electric switches, and in particular to a type of switch wherein it is desirable to provide for the energization of one or a plurality of circuits by the axial shifting of a plunger, with all circuits being de-energized at opposite extremities of the plunger's stroke.

Such a switch is well-adapted for numerous different applications. It is particularly well-suited, however, to multispeed devices, wherein it is desirable to provide an easily operated, positive action switch to effect the changes in speed. Two suitable environments for the switch are the self-propelled invalid chair and the electrically-driven automobile. As will be apparent from the following detailed description, the switch may be installed in such vehicles so as to be convenient for either hand or foot operation.

For instance, in a self-propelled invalid chair, the switch might well be installed in the end of a handle used for steering the chair. In this location it is possible for the occupant of the chair to start, stop, change speeds and steer using only one hand. In an electrically-driven automobile the switch may be installed in the floorboard of the vehicle convenient to the foot of the driver, similar to the accelerator on a gasoline vehicle. The speed of the automobile is then governed by the pressure of the driver's foot on the switch, substantially the same physical movement being required as in the gasoline-driven vehicle.

Heretofore controller mechanisms for use in electrically-propelled automobiles have been quite complicated and unwieldy. They have largely consisted of a rotatable drum with a projecting movable handle which had to be manipulated through a series of positions to control the speed of the vehicle. The instant device presents a relatively small, easily operated control which may be adapted to provide any desired number of speeds.

Another important advantage, particularly in regard to the aforementioned invalid chair and automobile applications, is that all circuits are de-energized when the plunger is at either extremity of its stroke. By the action of a spring bearing against the plunger, the switch returns to one of its "off" positions whenever pressure is relaxed from the plunger. Thus, if the operator should fall from the vehicle or for any reason unintentionally relax the pressure on the plunger, the motive means would be disconnected, and the chair or vehicle would come to rest. Conversely, if the operator were to become frightened or panicked and "freeze" on the switch, pushing the plunger all the way to the inner extremity of its stroke, all circuits would be likewise de-energized, and the vehicle would stop.

The switch of the invention includes a sleeve-like outer member, in which the body of the switch is receivable. The contacts, lead wires, plunger, etc. are easily assembled on the body, and the entire unit inserted into the sleeve. The enclosing sleeve, body, and plunger are preferably made of an electrically non-conductive material, such as a composition composed of a shredded fibrous material and Bakelite, or the like. A characteristic of such a composition is that it expands as it absorbs moisture. Thus, if the switch body is moisture free when it is slidably received within the sleeve, the body will tend to swell or expand as it absorbs moisture from the surrounding atmosphere, assuring a tight fit of the body assembly within the sleeve.

Although the following description and attached drawings show the invention as embodied in a switch having electrical contacts therein, it will be obvious to any one skilled in the art that other embodiments are possible. For instance, the switch could be fluid pressure operated by a slave cylinder and piston.

A primary object of this invention is the provision of a plunger switch wherein the energization of one or a plurality of circuits is effected by the axial shifting of the plunger within the switch body, and which switch is of simple and foolproof construction.

Another object of the invention is the provision of a plunger switch wherein all circuits are de-energized at opposite extremities of the plunger's stroke.

A further object of the invention is the provision of a plunger switch for energization of a plurality of circuits, wherein all circuits are de-energized between adjacent operative positions of the switch.

Another object of the invention is the provision of a plunger switch wherein the switch assembly proper may be pre-assembled and inserted as a unit within a sleeve-like outer member.

Other objects, advantages, and meritorious features will more fully appear from the following specifications, claims, and attached drawings wherein:

FIG. 5 is a cross-sectional view taken along line 5—5 of FIG. 2 showing the relation between one set of contacts, the plunger mechanism, and the slots in the body.

Figure 1:
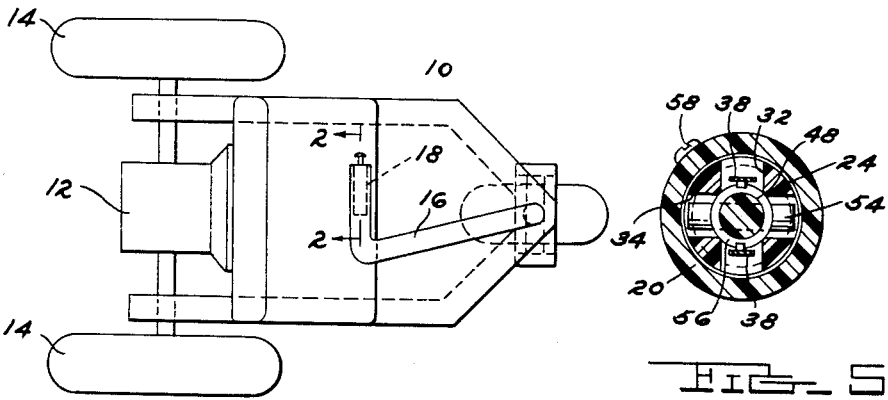
FIG. 1 is a schematic diagram of a self-propelled invalid chair showing a preferred embodiment of the invention installed in the steering handle of the chair.

Referring now to the drawings, it will be seen that FIG. 1 shows a self-propelled invalid chair 10 having an electric motor 12 which drives the two rear wheels 14. A steering handle 16 is provided with a plunger switch 18 embodying the invention which energizes electrical circuits of motor 12 providing speed control therefor.

The remaining figures of the drawings show the switch of the invention more particularly. The plunger switch 18 comprises a sleeve-like member 20, and a cylindrical body member 22 receivable within sleeve 20. The body 22 has an outer end portion 24 and an inner end portion 26. A cylindrical recess 28 extends axially through the outer end portion 24 and connects at the interior face 31 with another axial cylindrical recess 30 in the inner end portion 26. The recess 30 is preferably of smaller diameter than recess 28 for purposes set forth hereinafter. Two transverse perpendicular slots 32 and 34 extend diametrically through the outer end portion 24 of the body intermediate opposite ends thereof and terminate at the inner end at interior face 31 and terminate at the outer end at face 33. Longitudinally extending reliefs 36 are provided along the periphery of the inner end portion 26 of the body in circumferential alignment with slots 32 and 34.

Figure 2:
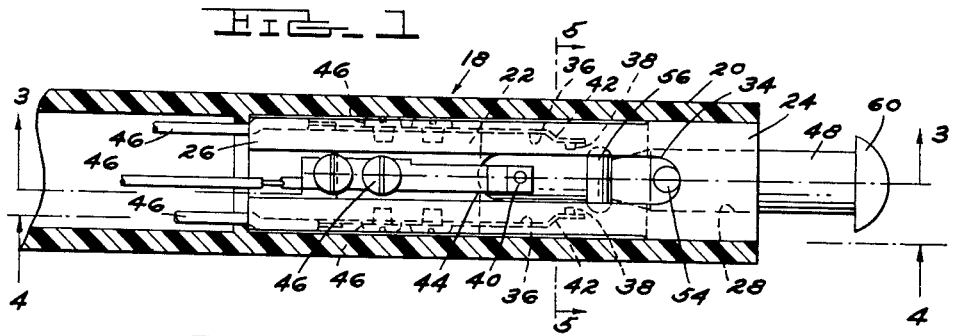
FIG. 2 is a longitudinal cross-sectional view of the invention showing details of the contacts and the plunger mechanism.

A plurality of sets or pairs of electrical contacts 38 and 40 are positioned within the slots 32 and 34, one set being clearly shown in FIGS. 2 and 5. The contacts have arms 42 and 44 extending therefrom which are positioned in the reliefs 36 and are secured therein by means of screws 46. As each set of contacts and arms are identical, the complementary members of respective sets are designated by the same numeral. The arms 42 and 44 are preferably of electrically conductive spring steel or a copper or brass alloy or the like so as to tension the sets of contacts 38 and 40 radially inwardly to insure a positive engagement with the ferrule, as hereinafter more completely described. Lead wires 46 are attached to the inner ends of the arms 42 and 44 by soldering or in any other suitable manner, and extend forwardly of the body in the reliefs 36.

A plunger 48 of electrically non-conductive material but having a circumferential electrically conductive portion extends longitudinally into body 22 through recess 28. The inner end of the plunger extends into recess 30 as at 50. A compressible spring 52 is positioned within recess 30 and bears against the inner end of plunger 48, biasing the plunger 48 outwardly of the body 22. The inner recess 30 serves both to house the spring 52 and aid in guiding the plunger 48 through its stroke. The plunger 48 is provided with diametrically opposed projecting pin means 54 which engages slot 34 and is axially shiftable therein with plunger 48. The relation of pin 54 to slot 34 is shown clearly in FIG. 5. An electrically conductive ferrule 56 is fixedly positioned on the plunger 48 and is axially shiftable therewith. The transverse width of ferrule 56 is slightly greater than the distance between the oppositely facing contacts which comprise a set, such as the set indicated by numerals 38 in FIG. 2. As each contact is tensioned radially inwardly by the action of its extending arm (such as shown at 44 in FIG. 3) the ferrule in engaging any given set of contacts urges them radially outwardly. The contacts thus press tightly against the outside circumference of the ferrule, assuring a positive electrical connection therebetween. In addition, the axial length of ferrule 56 is less than the axial distance between adjacent sets of contacts, so that between any two operative switch positions there is provided a neutral or "off" position, wherein all circuits are de-energized.

In one embodiment of the switch 18, the sleeve 20 may be made integral with a steering handle or the like, such as indicated by numeral 16 of FIG. 1. In such embodiment, body 22 may be secured within sleeve 20 by means of a screw such as is shown at 58 in FIG. 5. The sleeve 20 may also be made as a separate piece, just long enough to accommodate the body 22. In the latter case, the sleeve 20 may be provided with suitable means for mounting the switch in any desired location. In either of the above alternate constructions of the sleeve member 20, the other parts comprising the switch assembly proper may be pre-assembled and inserted as a unit within the sleeve. As is shown in the drawings, plunger 48 may be provided at its outer end with a bead 60 for easy operation of the switch.

The sleeve-like outer member 20, the body 22 and the plunger body are preferably made of an electrically non-conductive material. One composition that has been found particularly suitable consists of a shredded fibrous material and Bakelite. This composition possesses the properties of substantial rigidity and electrical non-conductivity necessary for electrical plunger switch members. In addition, such composition has a tendency to expand or swell as it absorbs moisture. Thus, if the body 22 is dried out before assembly with the sleeve 20, upon being slidably received within the sleeve the body will absorb moisture from the atmosphere, causing it to swell and become tightly held within the sleeve.

*Operation*

Figure 3:
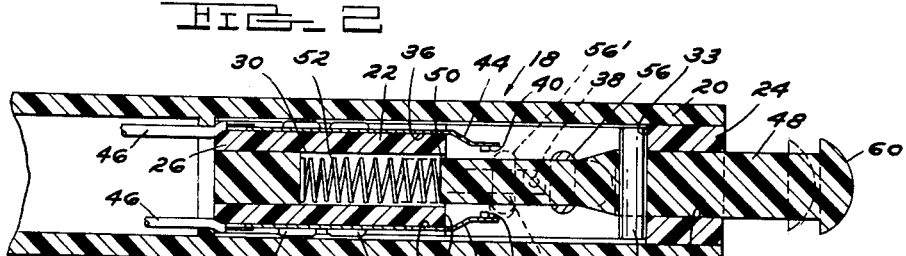
FIG. 3 is a cross-sectional view taken along line 3—3 of FIG. 2.
Figure 4:
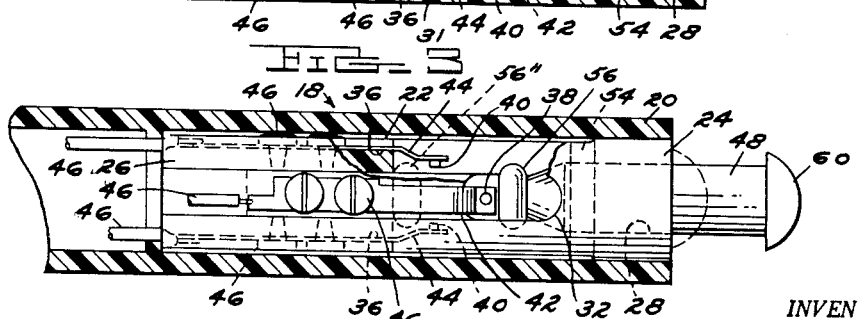
FIG. 4 is a cross-sectional view taken along line 4—4 of FIG. 2 with certain portions broken away for clarity.

With the switch in its idle or unattended condition, the plunger 48 is held at the outer extremity of its stroke by the action of spring 52 against the inner end of the plunger, biasing the pin means 54 into the outer end of slot 34 as shown in FIG. 3. In this position the ferrule 56 is positioned toward the outer end of the switch from the first set of contacts 38, most clearly shown in FIG. 2. This is an "off" position. As the plunger 48 is shifted inwardly by the operator pressing on bead 60, the ferrule 56 engages the set of contacts indicated by numeral 38 and a circuit from one contact, through the ferrule to the other contact is completed. As the plunger 48 is moved further inwardly, the ferrule 56 reaches the position indicated by numeral 56' in FIG. 3. At such position the ferrule is now between the sets of contacts 38 and 40. The first circuit is broken, and the switch is in a neutral or "off" position. Further inward movement of plunger 48 causes ferrule 56 to engage the set of contacts designated by numeral 40, and a second circuit is activated. Finally, as the plunger 48 is moved to the inner extremity of its stroke, ferrule 56 comes up against the inner portion 26 of body 22, as indicated at 56" in FIG. 4. With the plunger 48 at this inner extremity of its stroke, the switch is in another "off" position and all circuits are de-energized.

As can be seen from the above description, the relation and interaction between the sets of contacts and the ferrule is such that the contacts tend to grip the ferrule as it engages a set of contacts. This gripping action presents a resistance to further movement of the plunger and thus gives the switch operator a "feel" for the energized switch positions.

As shown in the drawings and described hereabove, the switch has two sets of contacts and therefore two operative positions. However, such a switch may be provided with any number of sets of contacts, and may thereby provide for the operation of as many circuits as are desired. This feature is of particular advantage in speed control of motors, because a plurality of speeds may be provided for with one simple, inexpensive control switch.

The plunger switch of the invention may be installed directly in the circuit for operation of low voltage motors or the like, or may be placed in a separate circuit of low voltage when it is desired to operate devices supplied with higher voltages. In the latter instance the switch may be installed so as to operate a relay, which in turn supplies the higher voltage to control the operating device.

Another important feature lies in the relation and action between the contacts (for instance, the sets numbered 38 and 40) and the ferrule 56. In the ordinary contact switch the contacts come together face to face, completing the circuit. In the switch disclosed herein the ferrule 56 simultaneously engages each of the contacts comprising a set, completing the circuit. As the ferrule engages the contacts it is so formed as to cause a wiping action across the face of each contact. This wiping action assists in keeping the contact faces clean and free from the usual pitting, assuring more intimate contact between surfaces. This results in dependable, maintenance-free operation.

What is claimed is:

1. A plunger switch assembly comprising, in combination: an outer sleeve-like member; a cylindrical body member receivable within said sleeve and having an outer end and an inner end, said body having an axial cylindrical recess through said outer end and extending into said inner end, a pair of slots extending radially outwardly from said recess through opposite sides of said outer end perpendicular to each other, a plurality of longitudinally extending reliefs spaced apart around the periphery of said inner end; a plurality of sets of electrically conductive contacts spaced peripherally about said body adjacent said slots, said sets of contacts spaced apart longitudinally within said slots, said contacts having spring-like electrically conductive arms positioned within said reliefs and biasing said contacts radially inwardly; lead wires connected to the inner ends of said arms; a longitudinally extending cylindrical plunger axially movable within said body adjacent said contacts, said plunger having diametrically opposed projecting pin means positioned within one of said slots and shiftable therein; compressible spring means positioned within the inner end of said recess biasing said plunger outwardly of said body; an electrically conductive ferrule positioned on said plunger and axially shiftable therewith, said ferrule having a transverse width greater than the distance between the lateral faces of any set of contacts and having an axial length less than the distance between adjoining sets of said contacts, the opposite ends of said slots defining stop means limiting the stroke of said ferrule within said body, said sets of contacts being spaced from opposite extremities of the stroke of said ferrule a distance greater than the axial length of said ferrule.

2. In a plunger switch the combination comprising: a sleeve member, a cylindrical body member telescoped in the sleeve member and externally provided with a plurality of flat surface portions about the circumference thereof, and further provided with an axial plunger receiving bore, a plunger member telescoped in the sleeve member and supported by the axial bore of the body member for reciprocation therein, a plurality of pairs of electrical contacts in the sleeve member mounted on and secured to the body member at said flat surface portions and arranged in axially spaced apart relation in radial opposition to and yieldingly biased toward the plunger member, a bridging contact mounted on and carried by the plunger member to engage successive pairs of contacts during relative axial movement between the members and with the contacts of each pair being simultaneously engaged or disengaged by the bridging contact to provide a double make and break connection between the contacts of each pair, that member upon which the bridging contact is mounted being of dielectric material, said pairs of contacts being spaced apart axially of the members a distance greater than the effective length of the bridging contact to provide a position during reciprocation of the plunger member in which the bridging contact is disposed intermediate adjacent pairs of contacts and disengaged from either of such pairs, and the surface of the plunger member which is opposed to the pairs of contacts during reciprocation of the plunger member being spaced radially from and out of engagement with said pairs of contacts on opposite sides of the bridging contact.

3. In a plunger switch the combination comprising: a tubular body member having an axial recess opening outwardly through one end, a plurality of spring contacts mounted on the outside of said body member, with each contact having a contact part extending through a side opening aperture in the body member and biased into the recess, said contacts arranged in pairs spaced apart axially of the body, each contact having means for connecting the contact in an electric circuit, a dielectric plunger telescoped in the recess of the body and extending outwardly through said one end supported in the body for reciprocation, an electrically conductive ferrule on the plunger having a diameter sufficient to engage successively said pairs of contacts during reciprocation of the plunger to provide a double make and break connection between the contacts of each pair, said axial spacing of the pairs of contacts being greater than the effective length of the ferrule to provide a position during plunger reciprocation in which the ferrule is disposed intermediate adjacent pairs of contacts and disengaged from either of such pairs, and the surface of said plunger which is opposed to the contacts during reciprocation of the plunger being spaced radially inwardly from and out of engagement with said pairs of contacts on opposite sides of the ferrule.

References Cited in the file of this patent
UNITED STATES PATENTS

| | | |
|---|---|---|
| 845,236 | Hewlett et al. | Feb. 26, 1907 |
| 963,301 | Leppert | July 5, 1910 |
| 1,222,215 | Klein | Apr. 10, 1917 |
| 1,473,212 | Davis | Nov. 6, 1923 |
| 1,581,387 | Clemence | Apr. 20, 1926 |
| 2,277,902 | Carbunaro | Mar. 31, 1942 |
| 2,780,700 | Wallace | Feb. 5, 1957 |
| 2,978,555 | Jones | Apr. 4, 1961 |